United States Patent [19]
Wheeler

[11] Patent Number: 5,322,316
[45] Date of Patent: Jun. 21, 1994

[54] ANTI-THEFT COUPLER DEVICE

[75] Inventor: James M. Wheeler, Rte. 1, Box 162, Willard, Mo. 65781

[73] Assignees: James M. Wheeler; Louise K. Wheeler, Willard, Mo.

[21] Appl. No.: 871,497

[22] Filed: Apr. 21, 1992

[51] Int. Cl.⁵ .............................................. B60D 1/28
[52] U.S. Cl. .................... 280/507; 280/511; 70/232
[58] Field of Search .............. 280/507, 511, 510, 512, 280/513, 504, 423.1, 417.1; 70/230, 231, 232, 14

[56] References Cited

U.S. PATENT DOCUMENTS

| | | |
|---|---|---|
| 2,440,744 | 5/1958 | Grinnell et al. . |
| 2,656,706 | 10/1953 | Lucas et al. . |
| 2,785,564 | 3/1957 | Rossi . |
| 2,969,993 | 1/1961 | Jasper . |
| 3,574,363 | 4/1971 | Stephenson ......................... 280/511 |
| 3,759,548 | 9/1973 | Kothmann .......................... 280/511 |
| 3,763,675 | 10/1973 | Hofmeisher et al. . |
| 3,922,897 | 12/1975 | Mickelson . |
| 4,141,233 | 2/1979 | Reyes . |
| 4,230,336 | 10/1980 | Avrea et al. ....................... 280/511 |
| 4,407,146 | 10/1983 | Nielsen, Jr. .......................... 70/232 |
| 4,428,596 | 1/1984 | Bell et al. ............................ 280/507 |
| 4,571,964 | 2/1986 | Bratzler ................................ 70/58 |
| 4,620,718 | 11/1986 | Mickelson ........................... 280/507 |
| 4,691,935 | 9/1987 | Brandt .................................. 280/507 |
| 4,836,570 | 6/1989 | Lopez et al. ........................ 280/507 |
| 5,052,203 | 10/1991 | Van Cuyk ............................ 70/232 |
| 5,076,077 | 12/1991 | Renne .................................. 70/232 |
| 5,087,064 | 2/1992 | Guhlin ................................. 280/507 |
| 5,154,440 | 10/1992 | Dolan et al. ........................ 280/507 |
| 5,165,265 | 11/1992 | Maionchi ............................. 70/14 |
| 5,181,405 | 1/1993 | Wheeler ........................... 280/507 X |
| 5,255,545 | 10/1993 | Wheeler ........................... 280/507 X |

FOREIGN PATENT DOCUMENTS 584555 10/1958 Italy .

Primary Examiner—Mitchell J. Hill
Assistant Examiner—Florian Zeender
Attorney, Agent, or Firm—Wm. Bruce Day

[57] ABSTRACT

An anti-theft coupler device obstructs a trailer hitch coupler to prevent undesired coupling to the tow ball of a towing vehicle. The device comprises a lock body cooperating with and obstructing front and rear facing portions of a trailer hitch coupler, a ball coupler having a resilient, smooth circular face for receipt by the trailer hitch coupler, a locking pin that locks the coupler device to the trailer hitch coupler, and a lock device for preventing access to the locking pin and the ball coupler. The lock body has upright sides with one upright side having an aperture aligned with the trailer hitch coupler for receiving the locking pin, such that the coupler device cooperates with the trailer hitch coupler to prevent undesired coupling. The lock device comprises a padlock that prevents access to the lock pin and undesired removal of the lock body from the trailer hitch coupler.

7 Claims, 3 Drawing Sheets

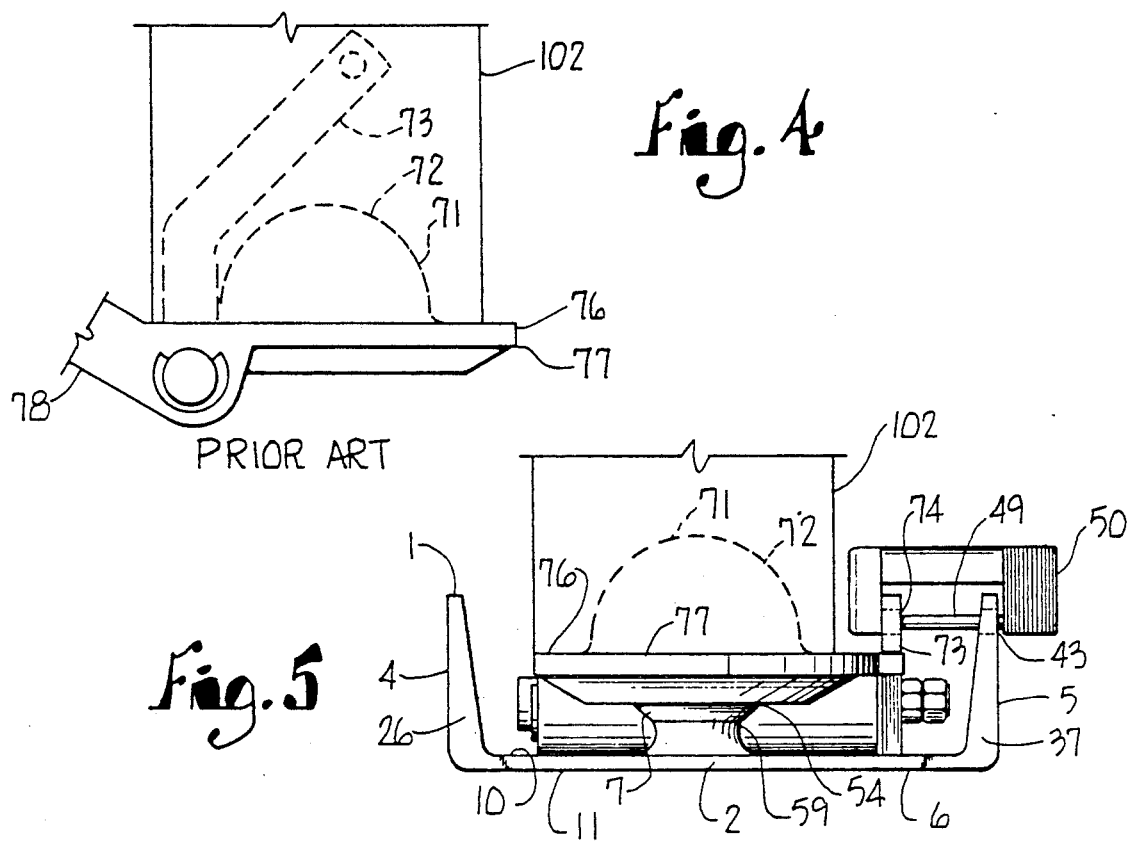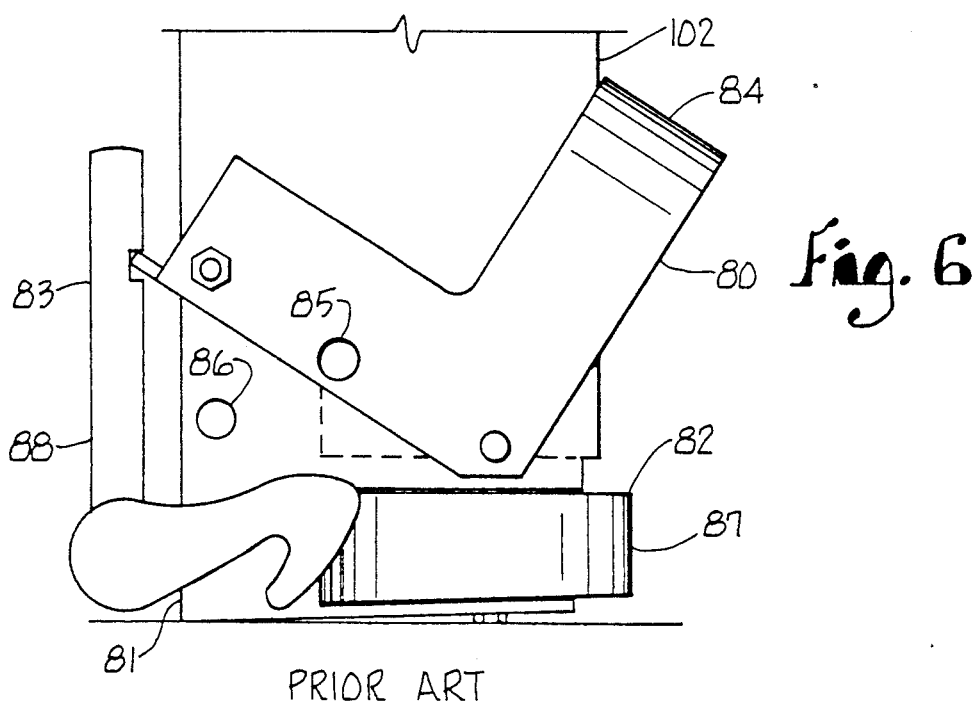

ANTI-THEFT COUPLER DEVICE

FIELD OF THE INVENTION

This invention relates to trailers attached to pull vehicles in general and in particular to an anti-theft coupler device.

BACKGROUND OF THE INVENTION

Trailers attached to pull vehicles are commonly used to transport machinery, livestock and other goods. When the trailer is unhitched from the pull vehicle, the trailer and its goods are subject to theft by undesired coupling to some other towing or pull vehicle. Trailer hitches are of a limited variety, frequently being of standard types of shapes. Examples are ball and socket hitching devices in which the trailer coupler consists of a socket which mounts on a ball attached to the pull vehicle; kingpin hitches which consist of cylindrical posts containing circumferential recesses and fit into matching openings mounted on the pull vehicle; and gooseneck hitches. The typical or standard trailer hitch consists of a socket attached to the lower end of a generally vertical post extending downwardly from the trailer. The posts and trailer hitches may have a horizontal component or beam at its upper end and which attaches to the front of the trailer. The trailer hitch coupler at the lower end of the post generally connects with a receiving device on the pull vehicle. The coupler itself consists of front and rear facing portions of different shapes and configurations.

To prevent undesired coupling of trailers to other pull vehicles, locks have been devised to fit over the ball or over or within the socket of a ball and socket type hitch. Such locking devices, however, generally have several moving parts and are not easily used or adapted for use with a trailer hitch coupler.

There are several prior art devices for preventing the undesired coupling of trailers to other pull vehicles. For example, F. H. Grinnell et al. U.S. Pat. No. 2,440,744 discloses a circular locking device for a kingpin of an upper fifth wheel plate of a trailer which consists of a locking plate, a locking member and a movable exposed lock. The locking device, when engaged, fits about the kingpin to prevent the kingpin from entering the receiving slot of a fifth wheel.

There is also G. L. Lucas et al. U.S. Pat. No. 2,656,706 which discloses a circular lock collar for trailer kingpins which consists of a split collar lock that includes semianular hinged sections, an annular groove and a key operator lock with a concealed bolt. The split collar device is positioned to enclose the kingpin and two semianular hinged sections are locked together by the concealed bolt of the key operated lock.

Additionally, A. J. Marx U.S. Pat. No. 3,662,320 discloses an electrical plug lock comprising of a frame and a bolt that cooperate to enclose electrical prongs of a plug. A conventional padlock is positioned to lock the frame to the plug.

A. K. Nielsen, Jr. U.S. Pat. No. 4,407,146 discloses a lock assembly that prevents unauthorized disconnection of a gas line from a gas meter. The lock assembly includes a male and a female telescoping shroud having an aligned aperture, a bolt lock and an end cap. The shrouds are positioned to enclose a threaded connection of the gas line to the gas meter. The bolt lock is positioned through the aperture when the shrouds are aligned. The end cap is engaged with the bolt lock to lock the shrouds together.

Additionally, G. A. Watson U.S. Pat. No. 4,444,031 discloses a security locking device for tackle boxes and the like that includes a sleeve member open at one end and closed at the opposite end, with the closed end secured to a permanent structure. The sleeve extends through an aperture of a tackle box. The open end has aligned bores to receive a padlock member that is then locked. D. E. Van Cuyk U.S. Pat. No. 5,052,203 discloses a locking device for a kingpin of a fifth wheel plate to a trailer. The locking device includes a cylindrical cup having a transversely extending slot, a hinged latch that is attached to the cup, aligned apertures in the latch that allows the conventional padlock to be engaged. The cup is positioned around the kingpin and the latch is related to the register within the slot. The latch is then aligned so that the apertures can receive a member of the padlock. The Italy Patent No. 584,555 discloses an elongated locking device with a bore that encloses a circular component that is to be locked. The locking device also has two sliding members with a key lock at the end of the larger of the two members, such that the members are slid together, the bore is then closed around the component. The key lock is then engaged locking the device and closing the component. Finally, the Britain Patent No. 959,271 discloses a key operated locking device associated with containers. The locking device includes a conventional padlock and an external holder adapted to retain the padlock. The holder includes an outer aperture, a bolt and a bracket having a threaded aperture that is attached to the inside of the container. The holder is then positioned over the top of the container. The apertures are aligned and the bolt is inserted through the apertures to attach the holder to the container. The padlock is engaged securing access to the container.

There is an additional prior art, C. Rossi U.S. Pat. No. 2,785,564 that shows a locking device for trailer coupler pin having two hinged mount halves which swing together about the trailer coupler. The halves each have ears with apertures through which a padlock is slipped. Note that in distinction to the structure, there is simply no concealed pins nor is there a removable lock means which prevents access to the concealed pins. Therefore, there is a need for a durable, inexpensive, simply operated, and effective trailer hitch lock for trailers with the locking devices having a singular lock body. Such locking devices should further contain means to prevent its undesirable removal from a coupler.

SUMMARY OF THE INVENTION

The anti-theft coupler device disclosed and claimed is for use with a trailer hitch coupler, the trailer hitch having a post with an upper and lower end, the upper end being attached to a trailer and the lower end being attached to a coupler, the coupler having front and rear facing portions and being adapted for releasable attachment to a towing vehicle. The locking device obstructs access to the hitch of the trailer to prevent undesired coupling of the coupler to the towing vehicle and securing means cooperating with said obstruction means to prevent undesired removal of said obstruction means from the coupler.

The anti-theft coupler device disclosed and claimed in one preferred form involves a lock body having a length substantially greater than the trailer hitch coupler to which the anti-theft coupling device is to be affixed. The lock body also has a ball coupler that is adapted to be received by the trailer hitch coupler, such that the anti-theft coupling device prevents undesired coupling of the trailer hitch coupler to a towing vehicle. The lock body includes an aperture which can be aligned with the trailer hitch coupler. A lock pin of a padlock can be inserted into the aperture and into the trailer hitch coupler, securing the anti-theft device to the trailer hitch coupler. The padlock prevents undesired access to the anti-theft coupler device when the lock is engaged and locked.

OBJECTS OF THE INVENTION

The objects of the present invention are; to provide an anti-theft coupler device for a trailer hitch coupler which cooperates with and obstructs a coupler portion of the hitch so as to prevent undesired coupling of the coupler with a pull or towing vehicle; to provide such an anti-theft coupler device with a lock or other means to secure the coupler device to the coupler of a trailer hitch to prevent undesired removal of the coupler device from the coupler; to provide an anti-theft coupler device shaped and adapted to receive the coupler of a trailer hitch; to provide an anti-theft coupler device which is strong, durable and configured to resist removal by cutting, prying, or other forcible or destructive means; to provide an anti-theft coupler device which is inexpensive to make, can be easily installed and removed, and can be easily locked and unlocked with a tool, tumbler, nation, or the like; to provide such an anti-theft coupler device with an internal lock pin to prevent easy access to the lock pin; to provide an anti-theft coupler device with an appropriate aperture and bore to receive the lock pin and secure or lock it in place; to provide such an anti-theft coupler device in a single assembly so that it can be easily stored and not subject to a loss of individual pieces or components of the assembly; to provide such an anti-theft coupler device with an internal lock pin having a key and a key insert for engaging and an internal lock piece to fix the locking device to the coupler of a trailer hitch to resist or prevent forcible or destructive removal of the coupler device from the coupler.

Other objects and advantages of this invention will become apparent from the following description taken in conjunction with the accompanying drawings wherein are set forth, by way of illustration and example, certain embodiments of this invention.

BRIEF DESCRIPTION OF THE DRAWINGS

FIG. 4 is a side elevational view of one form of a prior art gooseneck trailer hitch.

FIG. 5 is a front elevational view of the anti-theft coupler device installed and engaged hitch shown in FIG. 4.

FIG. 6 is a side elevational view of another form of prior art gooseneck trailer hitch.

DESCRIPTION OF THE PREFERRED EMBODIMENT

As required, detailed embodiments of the present invention are disclosed herein. It is, however, to be understood that the disclosed embodiments are merely illustrative of the invention, which may be embodied in various forms. Therefore, specific structural and functional details disclosed herein are not to be interpreted as limited, but merely as providing the proper basis for the claims and as a representative basis for teaching one skilled in the art to employ the anti-theft coupler device in virtually any appropriately specific and detailed structure.

Figure 1:
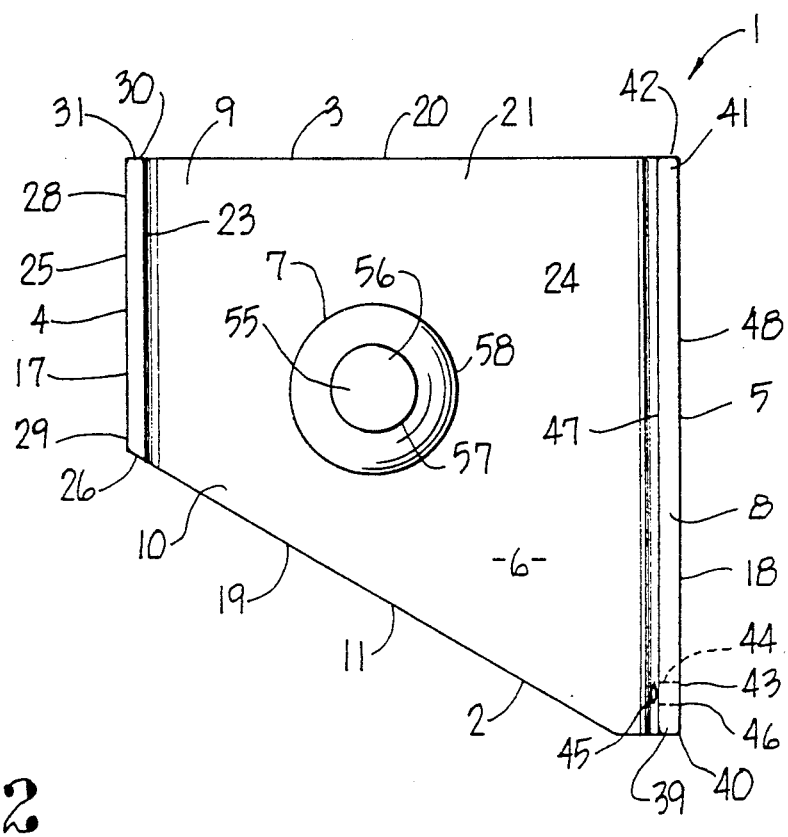
FIG. 1 is a top plan view of the anti-theft coupler device embodying the present invention and showing a ball coupler in the center of the coupler device.

The reference numeral 1, FIG. 1, indicates an anti-theft coupler device comprising a front facing end 2, an opposite rear facing end 3, a first upright side 4, a second upright side 5, a bottom 6, a ball coupler 7 and a top side 8. As shown best in FIGS. 5, 7 and 8, the device 1 is adapted to be inserted into a conventional coupler 105 of a trailer hitch 96 of a trailer 95, such as a Fulton Model GN-24 71 or an Auto Model SM-2516 80. The device 1 generally has a length that extends from the front facing end 2 to the opposite rear facing end 3 such that the length is substantially greater than the coupler 105. The device 1 is adapted to obstruct access to the coupler 105 and prevent undesired coupling with the coupler 105.

Figure 8:
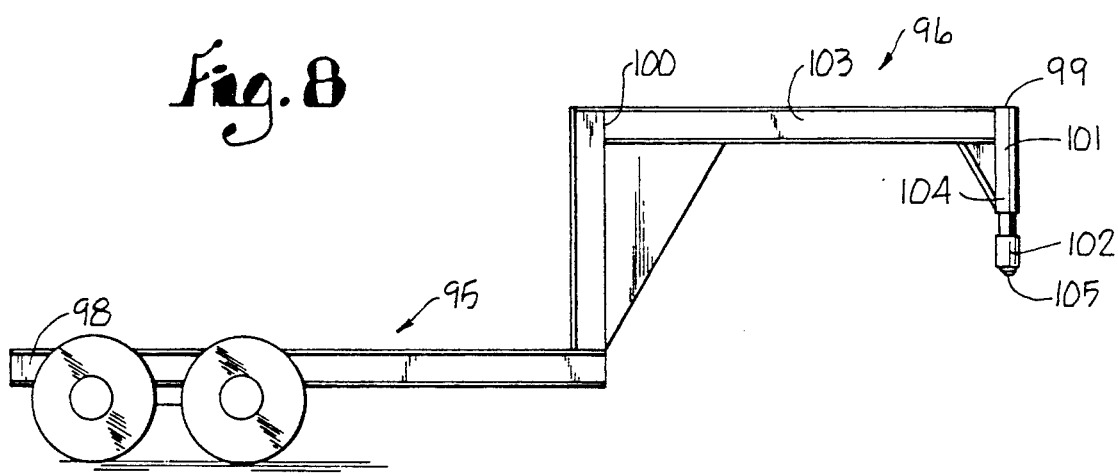
FIG. 8 is a fragmentary, side elevational view of a trailer showing a coupler trailer hitch.

Referring to FIG. 8, a trailer 95 is shown with a trailer hitch 96 mounted on a front facing portion 97 of the trailer 95, the front facing portion 97 being opposite a rear facing portion 98 of the trailer 95. The front facing portion 97 of the trailer 95 is connected to a towing or pull vehicle via the trailer hitch 96 and is the leading or forward aspect of the trailer 95 when pulled in a forward direction by the towing or pulling vehicle. As best shown in FIGS. 1 and 8, the front facing end 2 and rear facing end 3 of device 1 have the same directional aspects, respectively, as the front facing portion 97 and rear facing portion 98 of the trailer 95.

Figure 2:
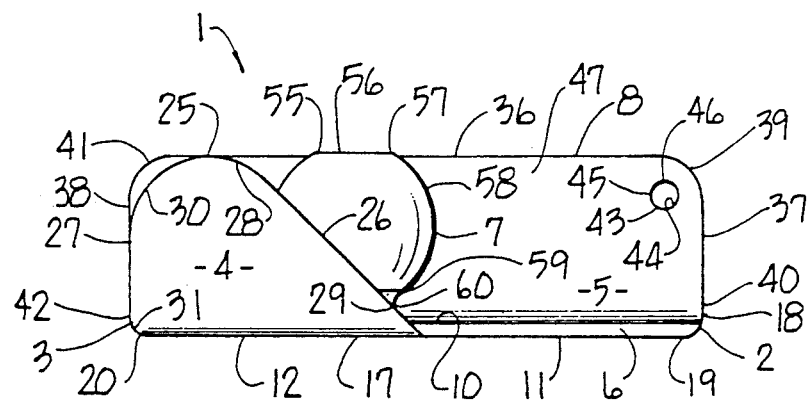
FIG. 2 is a side elevational view of the anti-theft coupling device.
Figure 3:
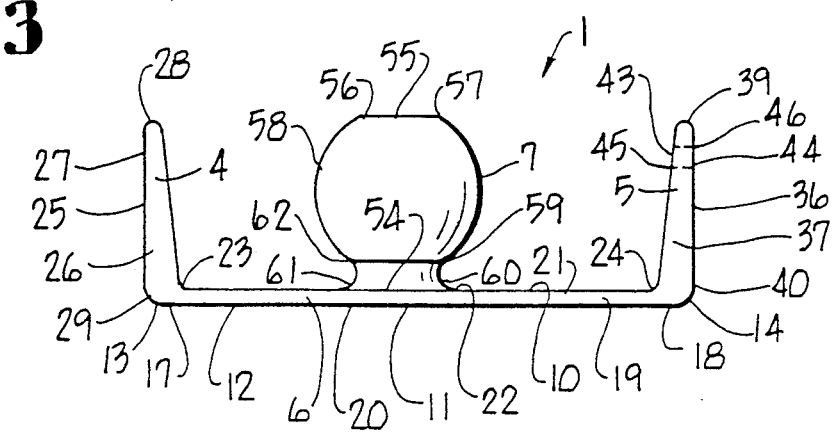
FIG. 3 is a front elevational view of the anti-theft locking device showing the ball coupler.

As best shown in FIGS. 1, 2 and 3, the bottom 6 of the device 1 comprises a working side 10, a blocking side 11, a front facing end 19 and a rear facing end 20. The working side 10 of the bottom 6 has a smooth surface 21, a surface joint edge 22, an interior first edge 23 and an interior second edge 24. The interior first edge 23 of the working side 10 is adjacent to and integral with the first upright side 4. The interior second edge 24 of the working side 10 is adjacent to and integral with the second upright side 5. The first and second upright sides 4 and 5, respectively, and the working side 10 form an obstruction support base 9 for the ball coupler 7. The front facing end 19 and the rear facing end 20 of the bottom 6 have the same directional aspects, respectively, as the front facing end 2 and rear facing end 3 of the device 1. Additionally, the front facing end 19 is adjacent to and integral with the front facing end 2. The rear facing end 20 is adjacent to and integral with the rear facing end 3.

The ball coupler 7 has a top side 55, a smooth circular face 58 and a joint 60 that has joint bottom edge 61 and a joint top edge 62. The smooth circular face 58 of the ball coupler 7 extends from the top side 55 to the joint top edge 62. The joint 60 extends from the joint top edge 62 to the joint bottom edge 61, such that the smooth circular face 58 of the ball coupler 7 is mounted on the joint 60. The joint bottom edge 61 is adjacent to and integral with the surface joint edge 22 of the working side 10 of the bottom 6. The ball coupler is generally centrally located on the working side 10 such that the obstruction support base 9 partially encloses the ball coupler 7.

The top side 8 of the anti-theft coupler device 1 is open and adapted to receive the coupler 105, such as a Fulton 71 or the Auto 80. The first and second upright sides 4 and 5, respectively, extend upward, perpendicular to the working side 10 of the bottom 6. The first upright side 4 has a top front facing end 28 and a top rear facing end 30. The second upright side 5 has a top front facing end 39 and a top rear facing end 41. The top front facing ends 28 and 39, respectively, and the top rear facing ends 30 and 41, respectively, together with the top side 55 of the ball coupler 7 form the top side 8 of the device 1.

The first and second upright sides 4 and 5, respectively, are adjacent to and integral with the blocking side 11 of the bottom 6. The first and second upright sides 4 and 5, respectively, are positioned such that they extend upward, perpendicular to and away from the blocking side 11 of bottom 6. The first upright side 4 has a first bottom side 17. The second upright side 5 has a second bottom side 18. Blocking side 11 has a smooth flat surface 12 having an outer first edge 13 and an outer second edge 14. The outer first edge 13 of the smooth flat surface 12 is adjacent to and integral with the first side bottom 17 of the first upright side 4. The outer second edge 14 of the smooth flat surface 12 is adjacent to and integral with the second side bottom 18 of the second upright side 5. The blocking side 11 of the bottom 6 and the first and second upright sides 4 and 5, respectively, together cooperate to obstruct undesired access to the coupler 105 of the trailer 95.

As best shown in FIGS. 1, 2 and 3, the ball coupler 7 further comprises a bottom side 54, a top side 55, a flat top surface 56, a top side outer edge 57, a smooth circular face 58 and a bottom side outer edge 59. The flat top surface 56 of the top side 55 is adjacent to and integral with the top side outer edge 57. The smooth circular face 58 of the ball coupler 7 extends from the top side outer edge 57 to the bottom side outer edge 59. The bottom side outer edge 59 is adjacent to and integral with the joint top edge 62 such that the smooth circular face 58 of the ball coupler 7 is mounted on the joint 60. The joint 60 extends from the joint top edge 62 to the joint bottom edge 61. The bottom side 54 of the ball coupler 7 is adjacent to and integral with the joint bottom edge 61. The ball coupler 7 has a height that generally extends from the top side 55 to the bottom side 54, and is adapted to be received by the conventional coupler 105, such as the Fulton 71 or the Auto 80.

Referring to FIGS. 1, 2 and 3, the first upright side 4 comprises an upper end 25, a front facing end 26, a rear facing end 27, a bottom front facing end 29 and a bottom rear facing end 31. The second upright side 5 comprises an upper end 36, a front facing end 37, a rear facing end 38, a bottom front facing end 40, a bottom rear facing end 42 and an aperture 43 having a smooth interior surface 44 with an inside edge 45 and an outside edge 46. The first upright side 4 has a length that extends from the front facing end 26 to the rear facing end 27. The front facing end 26 and the rear facing end 27 have the same directional aspects, respectively, as the front facing end 2 and the rear facing end 3 of the device 1. The rear facing ends 27 and 38 of the first and second upright sides 4 and 5, respectively, are adjacent to and integral with the rear facing end 3 of the device 1.

As best shown in FIG. 1, the front facing end 2 of the device 1 is positioned at an angle such that front facing end 37 of the second upright side 5 is located at a greater horizontal distance from the rear facing end 3 of the device 1 than front facing end 26 of the first upright side 4. The second upright side 5 has a length that extends from the front facing end 37 to the rear facing end 38. The front facing end 37 and the rear facing end 38 have the same directional aspects, respectively, as the front facing end 2 and the rear facing end 3 of the device 1. The angle placement of front facing end 2 causes the second upright side 5 to have a length that is generally longer than that of the first upright side 4. The shorter length of first upright side 4 provides for easy positioning and removing of the ball coupler 7 of the device 1 to the coupler 105 of the trailer 95. The longer length of the second upright side 5 provides for easy locking of the device 1 to the coupler 105 by using a padlock 50.

Referring to FIGS. 1, 2 and 3, the second upright side 5 has an aperture 43, an interior surface 47 and an exterior surface 48. The aperture 43 has a smooth interior surface 44, an inside outer edge 45 and an outside outer edge 46. The smooth interior surface 44 of the aperture 43 extends from the inside outer edge 45 to the outside outer edge 46. The inside outer edge 45 is adjacent to and integral with the interior surface 47 of the second upright side 5. The outside outer edge 46 is adjacent to and integral with the exterior surface 48. The aperture 43 is generally located close to the front facing end 37 of the second upright side 5, such that, as best shown in FIG. 5, the aperture 43 is adapted to receive a lock pin 49 of a conventional padlock 50.

Referring to FIG. 4, a Fulton Coupler 71 is shown attached to the lower end 102 of the trailer hitch 96 of trailer 95. The Fulton Coupler 71 has a coupler connecting face 72, a spring biased handle 73, an aperture 74, a coupler frame 76, a front facing side 77 and a rear facing side 78. The aperture 74 is located in the handle 73 and is adapted to receive the lock pin 49 of a pad lock 50. The coupler connecting face 72 is adapted to receive the ball coupler 7 of a towing or pulling vehicle and also of the device 1. The front facing side 77 and the rear facing side 78 of the Fulton Coupler 71 have the same directional aspects, respectively, as the front side portion 97 and the rear facing portion 98 of the trailer 95. When the ball coupler 7 is positioned within the coupler connecting face 72 of Fulton Coupler 71, the handle 73 is lowered such that the aperture 74 is aligned with the aperture 43 of the second upright side 5 of the device 1. The lock pin 49 of the padlock 50 can be inserted through the aligned apertures 43 and 74, and locking the device 1 to the Fulton Coupler 71. The ball coupler 7, the obstruction support base 9 formed by the first and second upright sides 4 and 5 and the working side 10 of the bottom 6, together with the blocking side 11 of the bottom 6 cooperate to obstruct undesired access to the Fulton Coupler 71. The obstructed access prevents undesired coupling with the trailer 95.

Figure 7:
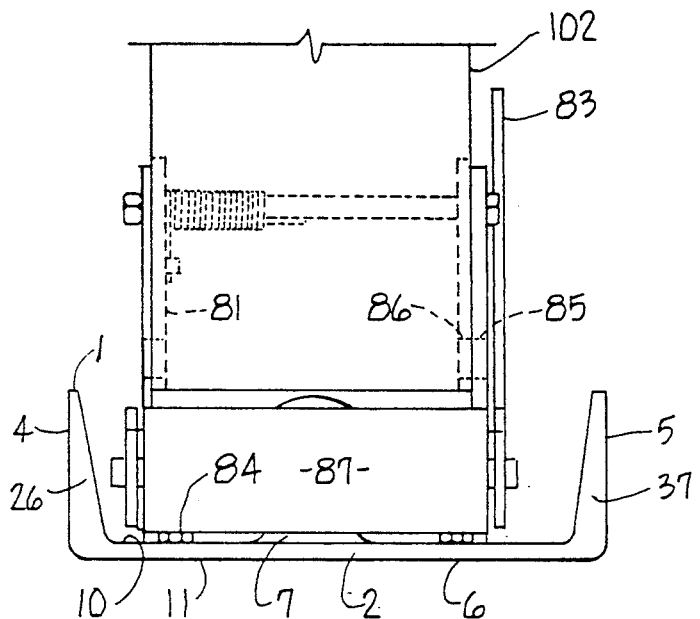
FIG. 7 is a front elevational view of the anti-theft coupler device installed and engaged in the hitch shown in FIG. 6.

Similarly, as shown best in FIGS. 6 and 7, the Auto Coupler 80 is shown attached to the lower end 102 of the trailer hitch 96 of trailer 95. The Auto Coupler 80 comprises a main body 81, coupler teeth 82, a spring biased handle 83, a spring biased guard 84 having an aperture 85, a main body aperture 86, a front facing end 87 and a rear facing end 88. The front facing end 87 and the rear facing end 88 of Auto 80 have the same directional aspects, respectively, as the front side portion 97 and the rear facing portion 98 of the trailer 95. The coupler teeth 82 are located at the front facing end 87 of the main body 81. The spring biased handle 83 and the spring biased guard 84 are attached to the main body 81. The spring biased handle 83 is adapted to maintain the spring biased guard 84 in an upward, unguarded position, such that the guard 84 is removed from the coupler teeth 82. In the unguarded position, the coupler teeth 82 are able to receive and enclose the ball coupler 7 of a towing or pulling vehicle or of the device 1. Once the ball coupler 7 is inserted within the coupler teeth 82, the handle 83 is moved thereby releasing the spring biased guard 84 that lowers and positions itself in front of the coupler teeth 82.

When the guard 84 is in the lowered position, the guard 84 obstructs access to the ball coupler 7. The aperture 85 in the guard 84 is then able to be aligned with the aperture 86 of the main body 81, allowing a lock pin 49 of the padlock 50 to be inserted through the apertures 85 and 86. The lock pin 49 maintains the spring biased guard 84 in the lowered and guarded position, thereby locking the ball coupler 7 in place. With the ball coupler 7 of the device 1 locked within the Auto Coupler 80, the device 1 prevents undesired access to the coupling teeth 82 of the Auto Coupler 80.

To remove the anti-theft coupler device 1 from the coupler 105, such as the Fulton Coupler 71 or the Auto Coupler 80, the padlock 50 is unlocked. The lock pin 49 of the pad lock 50 is then removed from the aligned apertures 43 of the device 1 and 74 of the Fulton Coupler 71, or from the aligned apertures 85 and 86 of Auto Coupler 80. The coupler ball 7 of the device 1 is then able to be disengaged from the coupler 105, allowing access to the coupler 105.

Although certain embodiments of this invention have been illustrated and described, it should be understood that the scope of this invention is not limited thereto, except insofar as such limitations are included in the following claims.

What is claimed and desired to be secured by Letters Patent is as follows:

1. An anti-theft coupling device which can be affixed to a coupler of a trailer hitch, the device comprising:
   (a) obstruction means for insertion into a receiving cavity of said coupler to prevent undesired coupling of said coupler to a trailer hitch, said obstruction means including:
      (i) a lock body having a length substantially greater than said coupler to which said device is to be affixed;
      (ii) a ball coupler permanently affixed to the lock body having a smooth circular face for insertion into said receiving cavity of said coupler;
   (b) securing means extending between said obstruction means and said coupler to prevent undesired access and removal of said obstruction means, said securing means including:
      (i) said obstruction means having an aperture which can be aligned with a hole in said coupler when said obstruction means cooperates with said coupler to prevent undesired coupling; and
      (ii) lock means extending through said aperture and said hole for preventing removal of said device from said coupler.

2. The anti-theft coupling device set forth in claim 1 wherein said lock body comprises:
   (a) a working side having first and second upright sides;
   (b) said first upright side having means for easy access to said ball coupler; and
   (c) said second upright side including the securing means to prevent undesired access and removal of said lock body from said coupler.

3. The anti-theft coupling device set forth in claim 1 wherein said lock means includes a lock pin that is readily received by said aperture and said hole.

4. The anti-theft coupling device set forth in claim 1 wherein said lock body has a bottom side preventing undesired access to said ball coupler and said coupler.

5. The anti-theft coupling device set forth in claim 2 wherein said securing means includes said aperture and said lock means for preventing removal of said lock body from said coupler, said aperture to be aligned with said hole in said coupler when said lock body cooperates with said coupler to prevent undesired coupling, said aperture adapted to receive said lock means.

6. The anti-theft coupling device set forth in claim 2 wherein said ball coupler extends outward from said working side.

7. An anti-theft coupling device which can be fixed to a coupler of a trailer hitch, the device comprising:
   (a) an obstruction means for insertion into a receiving cavity of said coupler to prevent undesired coupling of said coupler to a trailer hitch, said obstruction means including:
      (i) a lock body and a ball coupler;
      (ii) said lock body having a length substantially greater than said coupler to which said device is to be affixed, said lock body comprises:
         (1) a working side having first and second upright sides;
         (2) said first upright side having means for easy access to said ball coupler;
         (3) said second upright side having an aperture adapted to receive a lock means for preventing removal of said lock body from said coupler, said lock means includes a lock pin;
      (iii) said ball coupler having a smooth circular face for insertion into said receiving cavity of said coupler, said ball coupler permanently affixed to and extending outward from said working side;
   (b) a securing means extending between said obstruction means and said coupler to prevent undesired access and removal of said obstruction means, said securing means including:
      (i) said obstruction means being comprised of said aperture and a bottom side, said aperture to be aligned with a hole in said coupler when said obstruction means cooperates with said coupler to prevent undesired coupling, said bottom side preventing undesired access to said ball coupler and said coupler; and
      (ii) said lock means and said lock pin, said lock means extending through said aperture and said hole for preventing removal of said device from said coupler, said lock pin being readily received by said aperture.

* * * * *